May 29, 1928. 1,671,934
H. PRAUD
COMBINED REGULATOR AND TEMPERATURE INDICATOR
Filed Feb. 9, 1925 2 Sheets-Sheet 1

INVENTOR
Henri Praud
by C.F. Dylmer
his Attorney

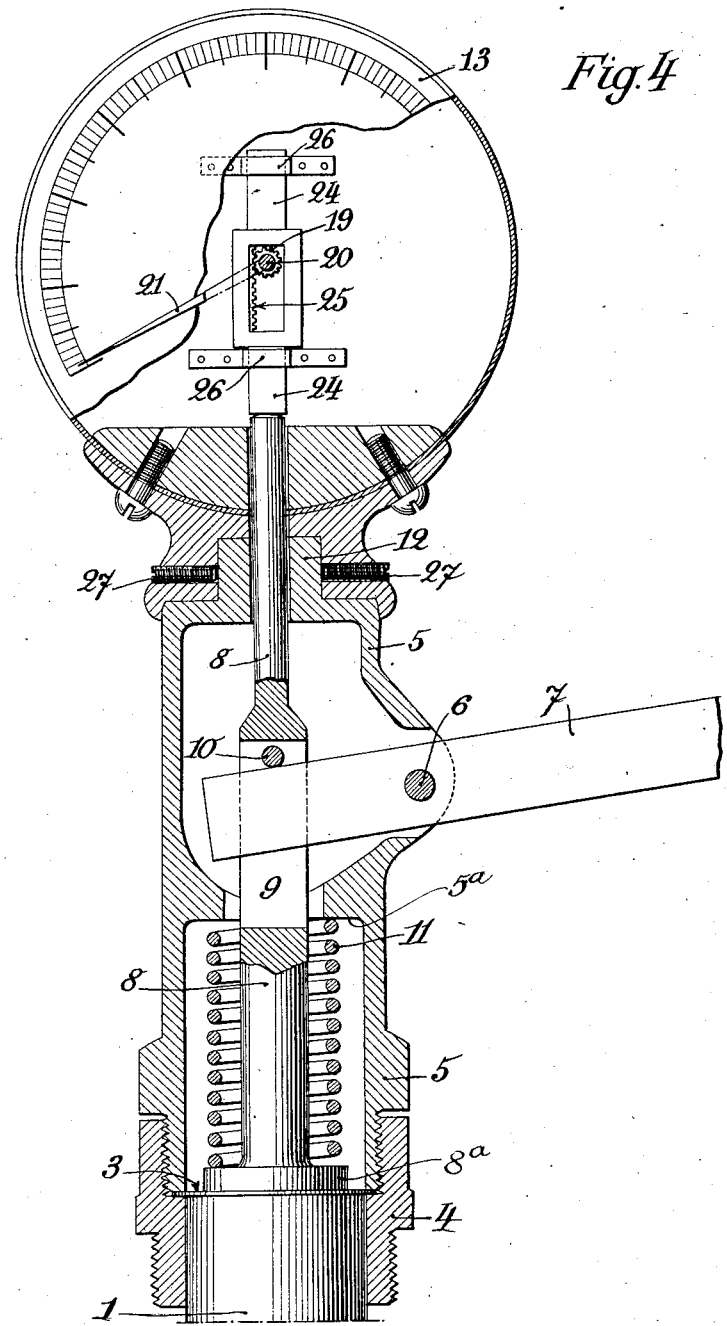

Patented May 29, 1928.

1,671,934

UNITED STATES PATENT OFFICE.

HENRI PRAUD, OF PARIS, FRANCE, ASSIGNOR TO AMERICAN RADIATOR COMPANY, OF NEW YORK, N. Y., A CORPORATION OF NEW JERSEY.

COMBINED REGULATOR AND TEMPERATURE INDICATOR.

Application filed February 9, 1925, Serial No. 7,858, and in France February 15, 1924.

The present invention relates to a combined regulator and temperature indicating device for boiler use, and chiefly for low-pressure boilers adapted for example for the heating of buildings.

The said apparatus comprises a thermostat including a movable rod which is vertically disposed and acts at its upper end upon a lever controlling the register or damper for the draught of the boiler; above the said thermostat is disposed a temperature indicator including a pointer which is mechanically connected to the said movable rod operated by the thermostat in such manner as to turn through angles proportional to the linear displacements of the said rod.

An important feature of the said invention consists in provision whereby the temperature indicator is so mounted upon the thermostat as to pivot or rotate upon the vertical axis thereof, and the indicator dial can thus be always placed parallel to the front face of the boiler irrespectively of the direction of the plane of oscillation of the regulating lever relatively to the said boiler front.

The appended drawings show by way of example two embodiments of the invention.

Fig. 4 is an elevational view of another embodiment, with parts shown in vertical section.

Figure 1:
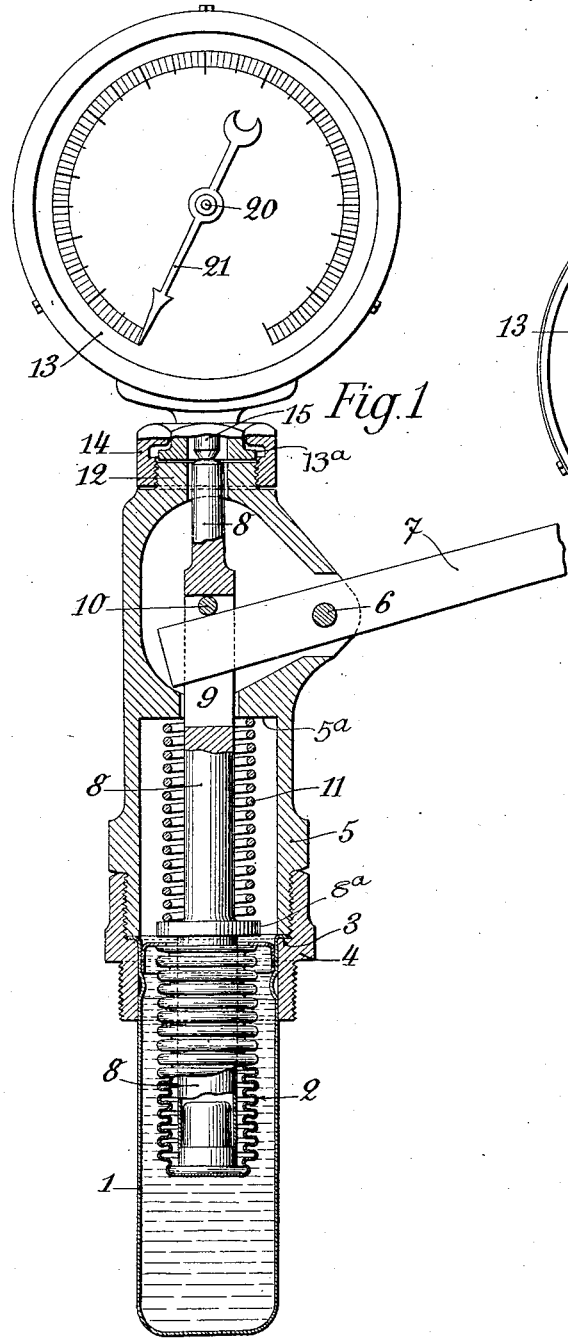
Fig. 1 is an elevational view of the apparatus, partly in vertical section.
Figure 2:
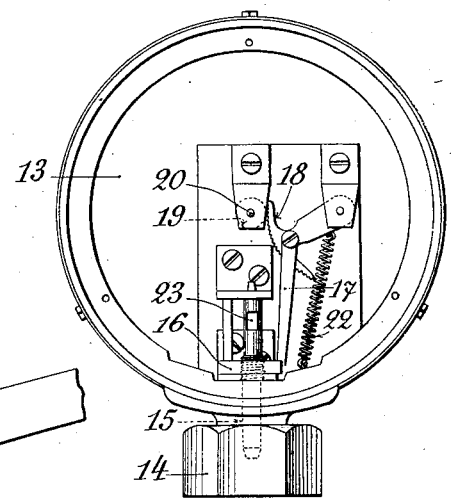
Fig. 2 is an elevational view of the rear of the temperature indicator, with the cover removed.
Figure 3:
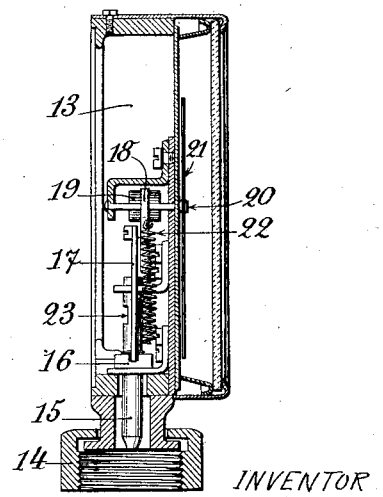
Fig. 3 is a cross section of the temperature indicator.

1 is the main body of the thermostat; 2 is the capsule which preferably includes a corrugated, expansible-collapsible element closed at its lower end and sealed at its upper edge or end to the body 1 to form a closed space for a suitable liquid which will expand at a determined temperature; 3 is a flange secured to 1 and preferably made of a soft metal so as to form a tight joint between the ring 4—adapted to be screwed upon the boiler—and a tubular body consisting of a cast iron socket 5 supporting the axis 6 of a lever 7 controlling the register.

The closed lower end of the said capsule is in contact with a rod 8 provided with a fork 9 between whose branches is engaged the inner end of the lever 7. The weight of the said lever and of the members supported thereby will urge the said inner end against an axis or pin 10 traversing the branches of the said fork; this weight, which tends to raise the rod 8, is balanced by a reaction spring 11 surrounding the latter rod and abutting a shoulder $5^a$ in the socket 5, and a flange or collar $8^a$ on said rod. Upon the top of the said socket 5 is a round boss 12 having an aperture at the centre which is loosely traversed by the top of the rod 8. The said boss supports the base of the dial temperature indicator 13; a nut 14 presses a flange $13^a$ of the said base upon the boss 12 which is externally screwthreaded to be engaged by the said nut 14.

The rod 8 actuates a vertically movable rod 15 in axial alinement with said rod 8 and which loosely contacts the upper end of the latter. The rod 15 has screwed thereon a nut 16 so that the motion of the rod 8 shall be readily imparted through said rod 15 to a lever 17 whereof one end engages a slot in the nut 16. The lever 17 actuates a toothed sector 18 engaging a pinion 19 keyed to the axis 20 of the pointer 21; a spring 22 urges the said pointer into the zero position; and the pointer will thus move around the dial through angles which are proportional to the vertical displacements of the thermostat rod 8.

The temperature indicator is standardized by turning the rod 15 by means of a flat portion 23, so that it will rise or descend in the said nut 16, and the pointer can be thus adjusted to the actual temperature. According to the needs of the installation, the pivoting plane of the lever 7 can be varied relatively to the front face of the boiler. However the indicator dial can be always brought parallel to the said face by turning the base of the indicator upon the top of the boss 12, the indicator being then secured in place by the nut 14.

In a modification which is shown in Fig. 4, the rod 8 also traverses an opening in the boss 12, but it extends within the case of the indicator 13 and is in contact at its top with a rod 24 comprising a rack 25 and slidable in two guides 26 secured to the indicator case; the said rack engages a pinion 19 whereby the pointer is moved through angles proportional to the movements of the rod 8. To place the indicator dial parallel to the front face of the boiler, the base of the indicator casing is properly bored in order that it receives and may rotate upon the boss 12; the indicator can then be secured in the desired position by means of the screws 27. In this form of the apparatus, the indicator can be turned about from the fact that the rod 24 rests simply upon the upper end of the rod 8.

In both forms of the invention shown and described herein, it will be noted that the main actuating rod 8 and the part or rod of the indicator engaged thereby are in longitudinal alinement and loosely engage each other by an end contact, so that the indicator body may be rotatably adjusted relative to the main body without disturbing or changing the operative connection between the main rod 8 and the indicator.

Obviously, the control mechanism for the pointer 21 may differ from what is herein represented in either form of the apparatus, without departing from the principle of the invention. In like manner, the particular construction of the regulating thermostat, the connection of the same with the control lever for the register, the shape of the socket, and the like, may be as desired.

Claims:

1. In a combined regulator and temperature indicating device for boiler use, the combination of a supporting element, a lever fulcrumed on said element and adapted to control the draft register of a boiler, a thermostat supported by said element, an element operatively connecting said thermostat and said lever, a temperature indicator of the dial and pointer type mounted rotatably on said supporting element, means for connecting said connecting element and pointer to actuate the latter and permitting rotation of the indicator relative to said supporting element without changing the operative connection between said connecting element and the indicator pointer, and means for securing said indicator to said supporting element.

2. In a combined regulator and temperature indicating device for boiler use, the combination of a supporting element, a lever fulcrumed on said element and adapted to control the draft register of a boiler, a thermostat supported by said element, a rod operatively connecting said thermostat and said lever, a temperature indicator of the dial and pointer type mounted rotatably on said supporting element, a connection between said rod and said pointer to actuate the latter and permitting rotation of said indicator relative to said supporting element without changing the operative connection between said rod and indicator pointer, and means for securing said indicator to said supporting element.

3. In a combined regulator and temperature indicating device for boiler use, the combination of a supporting element, a lever fulcrumed on said element and adapted to control the draught register of a boiler, a thermostat supported at the lower portion of said element, a temperature indicator of the dial and pointer type supported rotatably on the upper portion of said element above said lever, a rod actuated by said thermostat and operatively connected to said lever, means for imparting movement from said rod to said pointer and permitting rotation of said indicator relative to said rod, and means for securing said indicator on said supporting element.

4. In a combined regulator and temperature indicating device for boiler use, the combination of a supporting element, a lever fulcrumed on said element and adapted to control the draught register of a boiler, a thermostat supported at the lower portion of said element, a temperature indicator of the dial and pointer type supported rotatably on the upper portion of said element above said lever, a rod actuated by said thermostat and operatively connected to said lever, a rod in axial alinement with said first-named rod and in end contact therewith to transmit motion from said first-named rod to said pointer and permitting rotation of said indicator relative to said first-named rod, and means for securing said indicator on said supporting element.

5. In a combined regulator and temperature indicating device for boiler use, the combination of a tubular body, a thermostat supported at the lower portion of said body, a vertical rod actuated by said thermostat and extending within said body, a lever fulcrumed on said body and adapted to control a draught register, a connection between said rod and said lever, a temperature indicator of the dial and pointer type mounted rotatably on the upper portion of said body, a pinion connected with the indicator pointer, an element movable within the indicator and bearing loosely upon the upper end of said rod, said element and rod being in axial alinement, means for imparting the motion of said element to said pinion and hence to said pointer, and means for securing said indicator to said body.

6. In a combined regulator and temperature indicating device for boiler use, the combination of a tubular body having an opening at its upper end, a thermostat supported at the lower portion of said body, a vertical rod actuated by said thermostat and extending through said body and movable in said opening, a lever fulcrumed on said body and adapted to control a draught register, a connection between said rod and lever, a temperature indicator of the dial and pointer type mounted rotatably on the upper portion of said body to turn on an axis substantially coincident with that of said rod, a rod in axial alinement with said first-named rod an in end contact therewith to transmit motion from said first-named rod to said pointer and permitting rotation of said indicator relative to said first-named rod, and means for securing said indicator on said supporting element.

7. In a combined regulator and temperature indicating device for boiler use, the combination of a tubular body having a boss on its upper end through which is an opening, a thermostat supported at the lower portion of said body, a vertical rod actuated by said thermostat and extending through said body and movable in said opening, a lever fulcrumed on said body and adapted to control a draught register, a connection between said rod and said lever, a temperature indicator of the dial and pointer type mounted rotatably on said boss to turn on an axis substantially coincident with that of said rod, a rod in axial alinement with said first-named rod and in end contact therewith to transmit motion from said first-named rod to said pointer and permitting rotation of said indicator relative to said first-named rod, and means for securing said indicator to said boss.

In testimony that I claim the foregoing as my invention, I have signed my name.

HENRI PRAUD.